United States Patent
Kim et al.

(10) Patent No.: US 9,763,229 B2
(45) Date of Patent: Sep. 12, 2017

(54) METHOD AND APPARATUS FOR CONTROLLING TRAFFIC IN WIRELESS COMMUNICATION SYSTEM

(71) Applicant: Samsung Electronics Co., Ltd., Gyeonggi-do (KR)

(72) Inventors: Hyejeong Kim, Gyeonggi-do (KR); Sangsoo Jeong, Gyeonggi-do (KR); Yunsang Park, Gyeonggi-do (KR); Songyean Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/882,025

(22) Filed: Oct. 13, 2015

(65) Prior Publication Data

US 2016/0105881 A1  Apr. 14, 2016

(30) Foreign Application Priority Data

Oct. 10, 2014 (KR) .................. 10-2014-0136946

(51) Int. Cl.
| | | |
|---|---|---|
| *H04W 72/00* | (2009.01) | |
| *H04W 72/04* | (2009.01) | |
| *H04L 29/12* | (2006.01) | |
| *H04L 29/08* | (2006.01) | |
| *H04W 4/20* | (2009.01) | |
| *H04W 24/08* | (2009.01) | |
| *H04W 84/04* | (2009.01) | |

(Continued)

(52) U.S. Cl.
CPC ..... *H04W 72/0406* (2013.01); *H04L 61/2007* (2013.01); *H04L 67/10* (2013.01); *H04W 4/20* (2013.01); *H04M 15/8083* (2013.01); *H04M 2215/0192* (2013.01); *H04W 4/24* (2013.01); *H04W 24/08* (2013.01); *H04W 84/042* (2013.01)

(58) Field of Classification Search
CPC . H04W 72/0406; H04W 24/08; H04W 28/02; H04W 4/24; H04W 84/042; H04L 67/10; H04L 61/2007
USPC .......................................... 455/450; 370/338
See application file for complete search history.

(56) References Cited

U.S. PATENT DOCUMENTS

2010/0110961 A1  5/2010  Chao et al.
2012/0260312 A1  10/2012  Backman et al.
(Continued)

FOREIGN PATENT DOCUMENTS

| WO | WO 2013/006219 | 1/2013 |
|---|---|---|
| WO | WO 2013/085314 | 6/2013 |
| WO | WO 2014/163346 | 10/2014 |

OTHER PUBLICATIONS

3rd Generation Partnership Project; Technical Specification Group Services and System Aspects; Architecture Enhancements for Non-3GPP Accesses, (Release 12), 3GPP TS 23.402 V12.6.0, Sep. 22, 2014, 288 Pages.

(Continued)

*Primary Examiner* — Marcos Batista
(74) *Attorney, Agent, or Firm* — The Farrell Law Firm, P.C.

(57) ABSTRACT

Methods and apparatuses are provided for signal transmission and reception between a user equipment, a base station, and a server in a mobile communication system. The user equipment obtains control information related to traffic associated with the user equipment. The user equipment transmits a user plane message created based on the control information, to the server, via the base station.

20 Claims, 14 Drawing Sheets

(51) Int. Cl.
*H04W 4/24* (2009.01)
*H04M 15/00* (2006.01)

(56) References Cited

U.S. PATENT DOCUMENTS

| | | | |
|---|---|---|---|
| 2012/0281685 A1* | 11/2012 | Kotecha | H04W 76/04 370/338 |
| 2013/0003577 A1 | 1/2013 | Gupta et al. | |
| 2013/0260715 A1 | 10/2013 | Li et al. | |
| 2013/0316674 A1 | 11/2013 | Cho et al. | |
| 2013/0326361 A1* | 12/2013 | Kendal | H04L 51/066 715/748 |
| 2014/0010161 A1 | 1/2014 | Jeong et al. | |
| 2014/0036785 A1 | 2/2014 | Li et al. | |
| 2014/0348029 A1 | 11/2014 | Lee et al. | |
| 2015/0365537 A1* | 12/2015 | Kahn | H04M 15/58 455/408 |
| 2016/0088468 A1* | 3/2016 | Sharma | H04W 8/205 370/329 |

OTHER PUBLICATIONS

3rd Generation Partnership Project; Technical Specification Group Services and System Aspects; Study on Policy Solutions and Enhancements, (Release 11), 3GPP TR 23.813 V11.0.0, Jun. 2011, 42 pages.
International Search Report dated Jan. 19, 2016 issued in counterpart application No. PCT/KR2015/010741, 7 pages.
European Search Report dated Feb. 17, 2016 issued in counterpart application No. 15189312.0-1854, 12 pages.

* cited by examiner

METHOD AND APPARATUS FOR CONTROLLING TRAFFIC IN WIRELESS COMMUNICATION SYSTEM

PRIORITY

This application claims priority under 35 U.S.C. §119(a) to a Korean Patent Application filed on Oct. 10, 2014, in the Korean Intellectual Property Office and assigned Serial No. 10-2014-0136946, the content of which is incorporated herein by reference.

BACKGROUND

1. Field of the Invention

The present invention relates generally to a method and an apparatus that deliver control information from a user equipment to a core network in a communication system, and more particularly, to a method and an apparatus that enable a user equipment to deliver control related information received from a server to a charging related server.

2. Description of the Related Art

Mobile communication systems have been developed to provide voice services while also allowing for user mobility. Such mobile communication systems have gradually expanded their coverage from voice services through data services to voice services through high-speed data services. However, current mobile communication systems suffer resource shortages and users demand even higher-speed services.

The 3rd Generation Partnership Project (3GPP) has been working to standardize specifications for the Long Term Evolution (LTE) system as a next generation mobile communication system. The LTE system aims to realize high-speed packet based communication supporting a data rate of about 100 Mbps. To achieve this, various approaches have been considered, such as, for example, reducing the number of nodes on a communication path by simplifying the network architecture and bringing wireless protocols as close as possible to wireless channels.

In such a communication system, a scheme is required that enables a user equipment to effectively deliver control information, received from a service providing server, to the core network.

SUMMARY

The present invention has been made to address at least the above problems and/or disadvantages and to provide at least the advantages described below. Accordingly, an aspect of the present invention provides a method and an apparatus that enable a user equipment to effectively deliver control information to a desired node on a core network.

Another aspect of the present invention provides a scheme that enables a user equipment to send control information to a core network using user plane messages other than control plane messages in such a manner that does not increase control plane overhead and does not cause a significant modification to the network configuration.

In accordance with an aspect of the present invention, a method is provided for signal transmission and reception for a user equipment in a mobile communication system. The user equipment obtains control information related to traffic associated with the user equipment. The user equipment transmits a user plane message created based on the control information, to a server, via a base station.

In accordance with another aspect of the present invention, a method is provided for signal transmission and reception at a traffic control node of a mobile communication system. The traffic control node receives a user plane message including control information related to traffic, from a user equipment. The traffic control node forwards the control information to a server, according to information contained in the user plane message.

In accordance with another aspect of the present invention, a user equipment capable of signal transmission and reception in a mobile communication system is provided. The user equipment includes a transceiver unit configured to send and receive signals to and from a base station. The user equipment also includes a control unit configured to control the transceiver unit and to obtain control information related to traffic associated with the user equipment and transmit a user plane message created based on the control information to a server, via the base station.

In accordance with another aspect of the present invention, a traffic control node is provided that is capable of signal transmission and reception in a mobile communication system. The traffic control node includes a transceiver unit configured to send and receive signals to and from at least one of a user equipment and a server. The traffic control node also includes a control unit configured to control the transceiver unit and to receive a user plane message including control information related to traffic, from the user equipment, and forward the control information to the server according to information contained in the user plane message.

According to another embodiment of the present invention, a method is provided for signal transmission and reception for a server in a mobile communication system. The server receives control information, from a traffic control node, according to information contained in a user plane message received at the traffic control node from a user equipment. The server determines whether the control information is valid or invalid. The server transmits, to the traffic control node, a result of the determination indicating whether the control information is valid or invalid.

According to another aspect of the present invention, a server capable of signal transmission and reception in a mobile communication system is provided. The server includes a transceiver unit configured to send and receive signals to and from a traffic control node. The server also includes a control unit configured to control the transceiver unit and to receive control information, from the traffic control node, according to information contained in a user plane message received at the traffic control node from a user equipment, determine whether the control information is valid or invalid, and transmit, to the traffic control node, a result of the determination indicating whether the control information is valid or invalid.

According to another aspect of the present invention, a non-transitory computer readable medium is provided with computer executable instructions stored thereon executed by a processor to perform a method of signal transmission and reception for a user equipment in a mobile communication system. The method includes obtaining control information related to traffic associated with the user equipment, and transmitting a user plane message created based on the control information, to a server, via a base station.

According to another aspect of the present invention, a non-transitory computer readable medium is provided with computer executable instructions stored thereon executed by a processor to perform a method of signal transmission and reception at a traffic control node of a mobile communication system. The method includes receiving a user plane message including control information related to traffic, from a user equipment, and forwarding the control information to a server, according to information contained in the user plane message.

According to another aspect of the present invention, a non-transitory computer readable medium is provided with computer executable instructions stored thereon executed by a processor to perform a method of signal transmission and reception for a server in a mobile communication system. The method includes receiving control information, from a traffic control node, according to information contained in a user plane message received at the traffic control node from a user equipment, determining whether the control information is valid or invalid, and transmitting, to the traffic control node, a result of the determination indicating whether the control information is valid or invalid.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION

Figure 1:
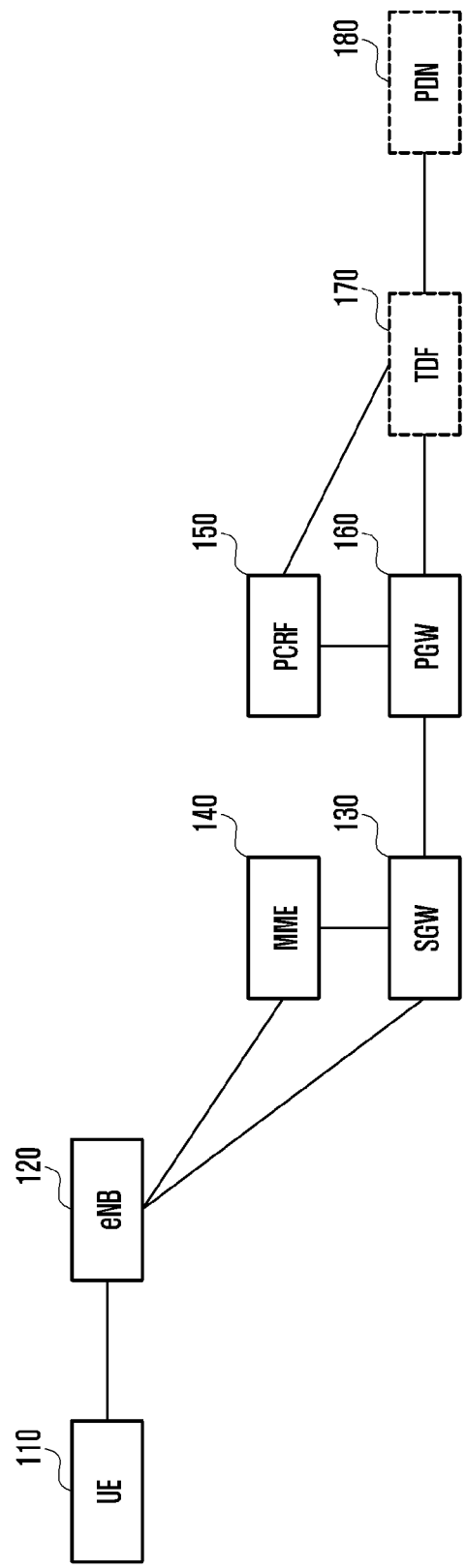
FIG. 1 is a diagram illustrating a communication system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out steps of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component such as, for example, a Field-Programmable Gate Array (FPGA) or an Application-Specific Integrated Circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

The following description of embodiments of the present invention is focused on the 3GPP LTE system. However, it should be understood by those skilled in the art that the subject matter of the present invention is applicable to other computer/communication systems having similar technical backgrounds and configurations without significant modifications departing from the spirit and scope of the present invention.

FIG. 1 is a diagram illustrating a communication system, according to an embodiment of the present invention. The communication system is described with a focus on an LTE mobile communication system. However, the following description may also be applied to other communication systems.

Referring to FIG. 1, a User Equipment (UE) 110 may send and receive signals to and from the communication system, according to an embodiment of the present invention. The communication system may include at least one of a base station (evolved NodeB (eNB)) 120, a Serving Gateway (SGW) 130, a Mobility Management Entity (MME) 140, a Policy and Charging Rules Function (PCRF) 150, a Packet Data Network Gateway (PGW) 160, a Traffic Detection Function (TDF) 170, and a Packet Data Network (PDN) 180.

As shown in FIG. 1, the radio access network of the LTE mobile communication system may include the eNB 120, the MME 140, and the SOW 130.

The UE 110 may connect to an external network through the eNB 120, the SGW 130, and the PGW 160. A PDN connection is established to enable the UE 110 to send and receive data through the PGW 160. One PDN connection may include one or more Evolved Packet Switched System (EPS) bearers.

The eNB 120 is a Radio Access Network (RAN) node, which corresponds to a Radio Network Controller (RNC) of a Universal Terrestrial RAN (UTRAN) system or Base Station Controller (BSC) of Global System for Mobile Communications (GSM) Enhanced Data Rates for Global Evolution (EDGE) RAN (GERAN) system. The eNB 120 is connected with the UE 110 through a wireless channel and functions in a manner similar to that of the existing RNC or BSC. In the LTE system, as all user traffic, including real-time services like Voice over Internet Protocol (VoIP) services, is served by shared channels, it is necessary to perform scheduling based on status information collected from the UE 110. The eNB 120 performs this scheduling function.

The SGW 130 provides data bearers, and may create and remove a data bearer under control of the MME 140.

The MME 140 performs various control functions, and may be connected to multiple eNBs.

The PCRF 150 performs overall QoS and charging control functions for traffic. The PCRF 150 controls policies related to user Quality of Service (QoS). Policy and Charging Control (PCC) rules corresponding to a specific policy are sent to the PGW 160 for enforcement.

The PGW 160 interconnects the operator network and an external PDN. The PGW 160 may enforce QoS/traffic policies and charging policies through the PCRF 150.

The TDF 170 detects traffic, and may inspect packets and report the inspection result to another network entity (e.g. PCRF 150). According to an embodiment of the present invention, the TDF 170 may be configured as a separate network node including a server, or as a function of the PGW 160.

The PDN 180 is a network capable of sending and receiving packet data. A representative example of a PDN is the Internet.

A scheme in which a user equipment sends control information (e.g., an access token containing traffic or charging control information) to a core network node using a user plane message (referred to as a user message or user data) is set forth below. In an embodiment of the present invention, the PCRF 150 is the node designated to receive control information from the user equipment. However, the present invention is not limited thereto. That is, an embodiment of the present invention sends control information from a user equipment to a core network node (e.g. PCRF, Application Function (AF)) by use of a user message, and may be applicable without restricting the message format or node type.

In an embodiment of the present invention, the scheme for sending control information may be used to deliver a sponsored data service involving a communication network operator and a third party (service provider). For example, under a sponsorship agreement, the third party service provider may provide a service to their users by using the operator's network, and may pay for the network traffic related to the service on behalf of users (sponsored data service or sponsored charging plan). In such an embodiment, the control information sent by a user equipment to the core network may include charging related information for the sponsored data service. The server may be an information server operated by the service provider.

For example, under a sponsorship agreement with a network operator, a shopping mall service provider may provide an online shopping service as a sponsored data service. In this case, users may use the online shopping service without extra communication charges, and the shopping mall service provider may benefit from increased sales and additional advertising and promotion opportunities due to an increased customer base.

A sponsored data service may be used in combination with a subscription to a specific communication service. For example, under a sponsorship agreement between a communication service provider and a third party service provider providing an application service, the communication service provider may offer a particular subscription option that allows users to utilize the application service of the third party service provider free of charge. The third party service provider pays for communication fees related to usage of the application service on behalf of users.

Figure 2:
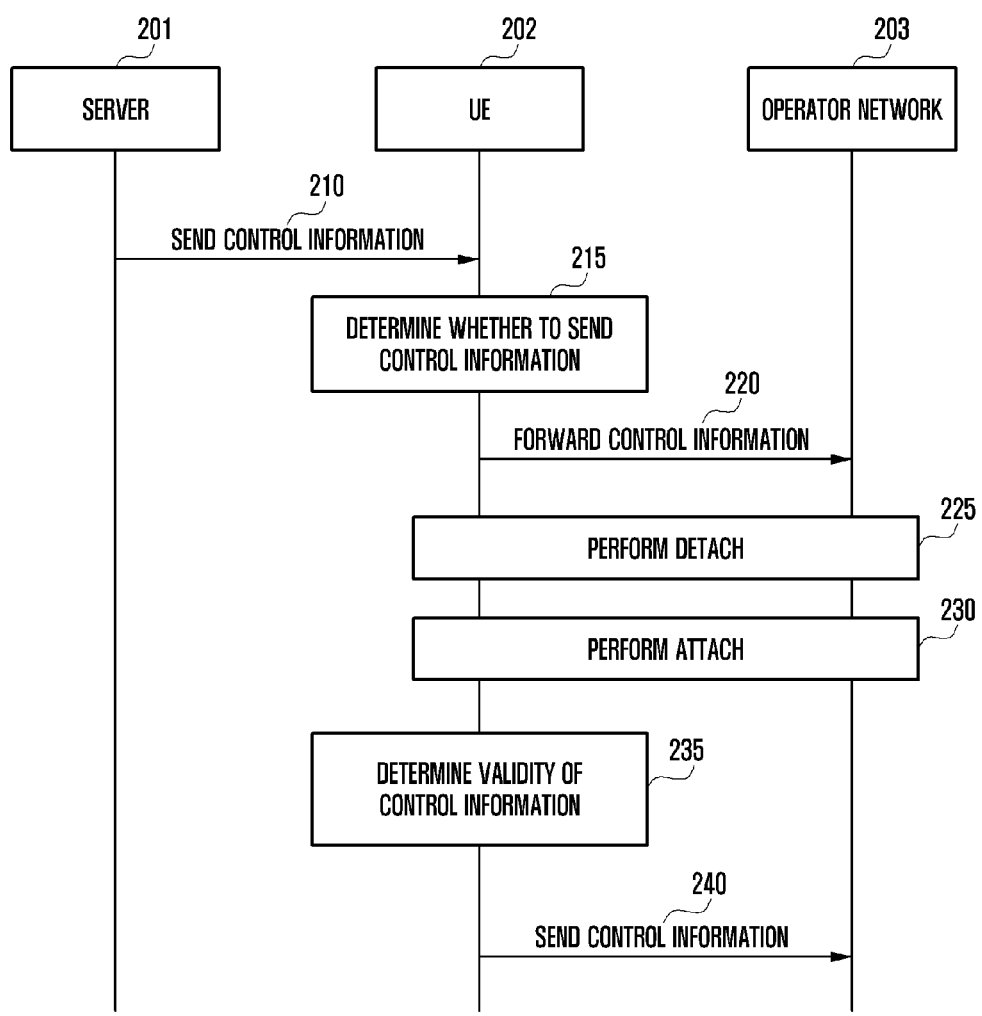
FIG. 2 is a sequence diagram illustrating a procedure to send control information from a user equipment to an operator network, according to an embodiment of the present invention.

FIG. 2 is a sequence diagram illustrating a procedure for sending control information from a user equipment to an operator network, according to an embodiment of the present invention.

Referring to FIG. 2, a UE 202 sends and receives signals to and from a server 201 and an operator network 203. The server 201 provides control information for a specific service to the UE 202, and the operator network 203 provides an environment whereby the UE 202 can connect to a PDN. Examples of the operator network 203 include the LTE network shown in FIG.

In step 210, the UE 202 receives control information from the server 201. The control information may be received in response to a request made by an application run on the UE 202. More specifically, the control information may be information for a sponsored service (e.g. an access token). The control information may include at least one of an address of the server 201, charging related information, and an expiration date of the access token.

In step 215, the UE 202 determines whether to send the control information to the operator network 203. In some embodiments, upon reception of control information, the UE 202 may transfer the control information to the operator network 203. When an item of the control information satisfies one of the preset conditions, the UE 202 may send the item to the operator network 203. The UE 202 may determine whether to send the control information based on the type of the application associated with the control information. Specifically, when the control information is received or when at least one item of the control information satisfies a preset condition, the UE 202 may send the control information to the operator network 203. Here, the preset condition may correspond to at least one of the type of control information (e.g., an access token), an identifier of the entity having created the control information (e.g., a sponsor ID or an application service provider ID), an identifier of the network operator (e.g., a Public Land Mobile Network (PLMN) ID), and an IP address or a port number of the server having sent the control information. In addition to the time when control information is received, when other conditions (e.g., a status condition or a timing condition) are satisfied, the UE 202 may send the stored control information to the operator network 203.

Upon determining to send the control information, the UE 202 sends the control information to the operator network 203. After sending the control information, the UE 202 performs a procedure for detachment from the operator network 203, in step 225. Detachment may be initiated when the user turns off the UE or when communication with the operator network has failed for at least a preset time.

In step 230, the UE 202 performs a procedure for attachment to the operator network 203 to resume service reception therefrom. Although new control information is not obtained, the UE 202 may send the stored control information to the operator network 203.

In step 235, the UE determines the validity of the stored control information. In alternate embodiments of the present invention, this validity check may be optional. The UE 202 may perform a validity check based on the received control information or information received together therewith. For example, the stored control information may be determined to be expired based on an expiration date attached to the control information. The UE 202 may perform a validity check through an exchange of signals with the server 201 or the operator network 203.

If the stored control information is valid, the UE 202 sends the control information to the operator network 203, in step 240.

Figure 3:
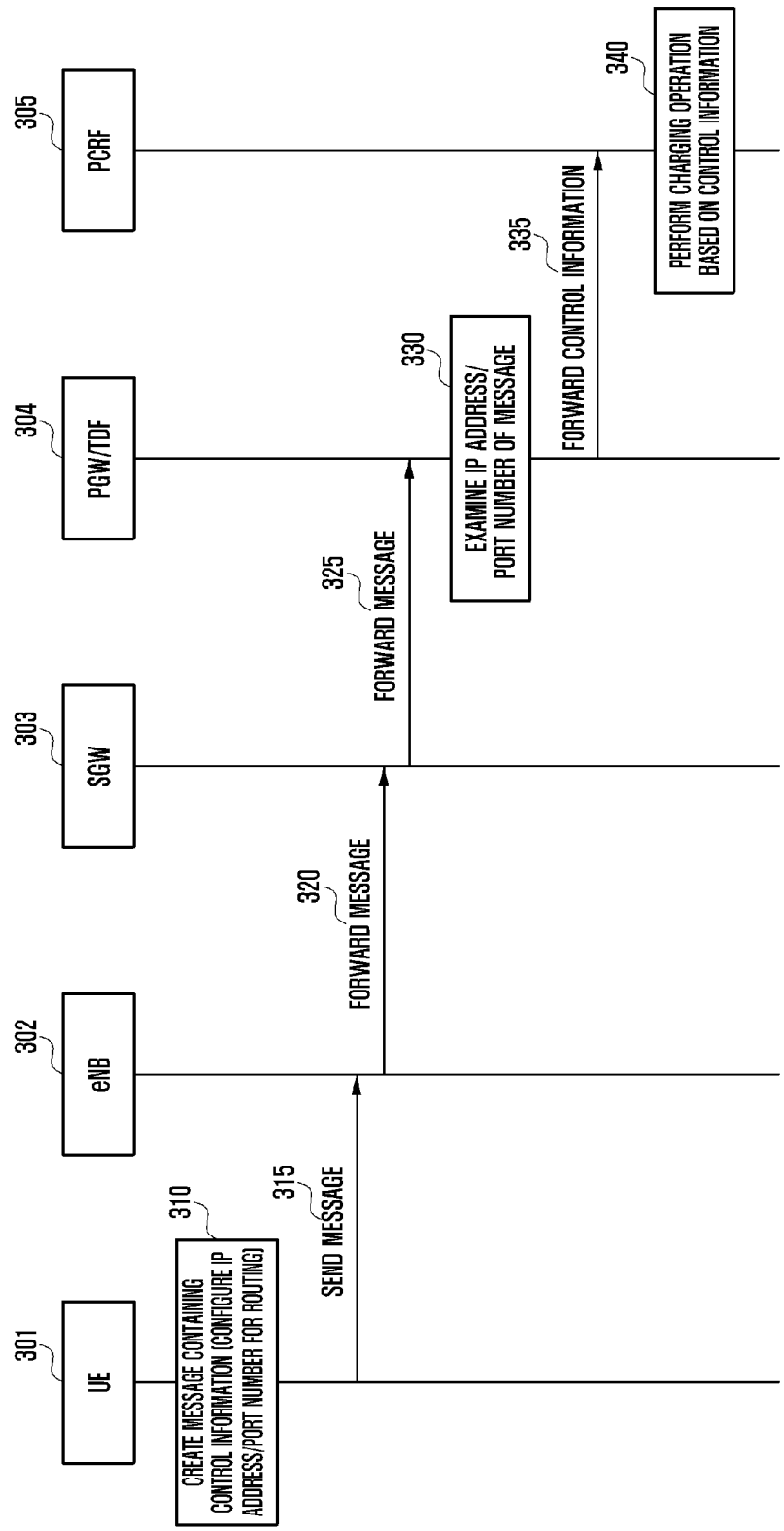
FIG. 3 is a sequence diagram illustrating a procedure to send control information from a user equipment to a core network node, according to an embodiment of the present invention.

FIG. 3 is a sequence diagram of a procedure for sending control information from a user equipment to a core network node, according to an embodiment of the present invention.

Referring to FIG. 3, entities including a UE 301, an eNB 302, an SGW 303, a PGW/TDF 304, and a PCRF 305 send and receive signals to and from another entity. The PGW/TDF 304 may be referred to as the PGW or the TDF, or to the TDF collocated with the PGW.

In an embodiment of the present invention, general packet communication functions and address/port based routing may be used between the UE 301 and the node receiving control information (i.e., the PCRF 305).

In order to send control information in a user message from the UE 301 to a suitable receiver node, at least one of an IP address and a port number identifying the node may be configured at the UE 301. This information may be pre-configured in the UE 301 or may be delivered through communication with a network entity (e.g., a configuration server). More specifically, at least one of an IP address and a port number may be configured at the UE 301 in order to send control information to the PCRF 305. To send control information to the PCRF 305, the UE 301 may send a message having the configured IP address and port number to the operator network.

To forward control information contained in a user message sent by the UE 301 to a suitable node, at least one of the IP address and the port number may be configured at nodes of the operator network that handle packets (e.g., the PGW/TDF 304).

In step 310, to send control information to a core network node (e.g., the PCRF 305), the UE 301 generates a user message containing control information (e.g., an access token). This user message is transmitted by using the IP protocol as a network layer protocol, and at least one of the receiver IP address at the IP header and the port number at the Transmission Control Protocol (TCP)/User Datagram Protocol (UDP) header may be set using the pre-configured information. The user message may be transmitted by using the UDP or TCP protocol as a transport layer protocol. The Hypertext Transfer Protocol (HTTP) or Session Initiation Protocol (SIP) may be used as an application layer protocol. When the UDP transport layer protocol is used, the UE 301 may send the user message as a UDP datagram without using a separate application layer protocol to reduce packet size and avoid unnecessary packet processing. To send control information without using an application layer protocol, the control information may be inserted in the payload part of a UDP packet.

In step 315, the UE 301 sends the generated user message to the eNB 302.

In step 320, the eNB 302 forwards the received user message to the SGW 303.

In step 325, the SGW 303 forwards the received user message to the PGW/TDF 304.

In step 330, the PGW/TDF 304 examines at least one of the destination IP address (IP header) and the port number (TCP or UDP header) of the received user message. Specifically, the IP address or port number for handling control information is configured in at least one of the PGW and TDF. Upon reception of a user message, the PGW or TDF determines whether the IP address or the port number of the received user message is identical to the IP address or the port number that is pre-configured for forwarding control information to another core network node (i.e., the PCRF 305).

If the destination IP address or port number of the received user message is identical to the IP address or port number that is pre-configured for forwarding control information to the PCRF 305, the PGW/TDF 304 forwards the user message to the PCRF 305, which is acting as the receiver node, in step 335. The PGW/TDF 304 may extract the control information (e.g., the access token) from the user message and send only the control information to the receiver node.

In step 340, the PCRF 305 performs additional charging or traffic control based on the control information received from the PGW/TDF 304. Specifically, the PCRF 305 may apply charging or traffic control to information that is sent or received later by the UE 301 based on the received control information.

Figure 4:
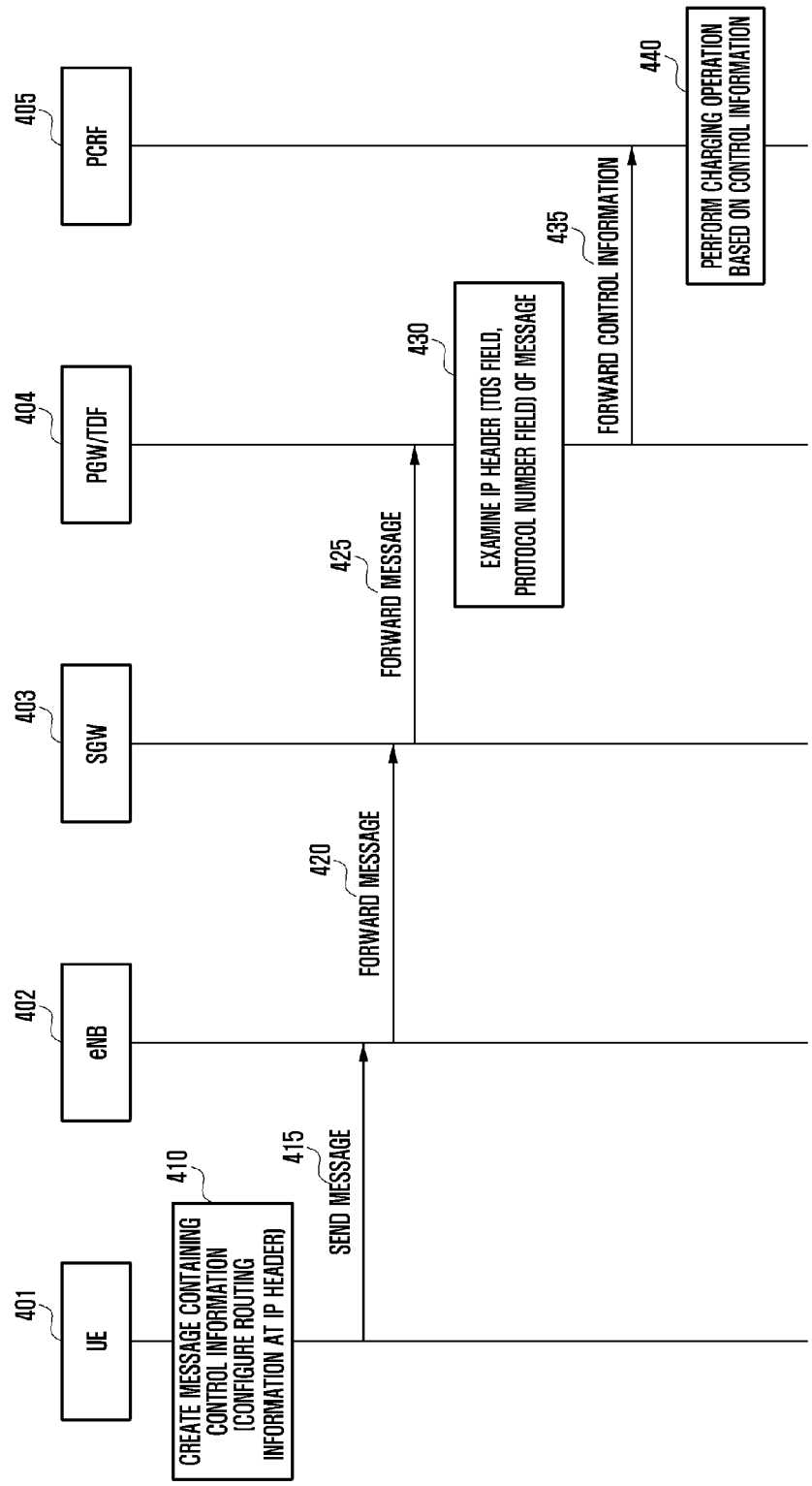
FIG. 4 is a sequence diagram illustrating a procedure to send control information from a user equipment to a core network node, according to another embodiment of the present invention.

FIG. 4 is a sequence diagram illustrating a procedure of sending control information from a user equipment to a core network node, according to another embodiment of the present invention.

Referring to FIG. 4, entities including a UE 401, an eNB 402, an SGW 403, a PGW/TDF 404, and a PCRF 405 send and receive signals to and from another entity.

According to an embodiment of the present invention, control information may be routed between the UE 401 and the node receiving control information (i.e., the PCRF 405) by using a Type-of-Service (ToS) field of the IP header.

Specifically, in order to send control information of a user message from the UE 401 to a suitable receiver node (e.g., the PCRF 405), the ToS field at the IP header of the user message may be set to a designated value. This value may be pre-configured in the UE 401 or may be delivered through communication with a network entity (e.g., a configuration server). The ToS field may be divided into a Differentiated Services Code Point (DSCP) field and an Explicit Congestion Notification (ECN) field. One or both of the DSCP field and the ECN field may be used to identify information. Specifically, to send control information to the PCRF 405, the UE 401 may assign a designated value in the ToS field at the IP header of the user message containing the control information. When the IP header of a received user message has the ToS field set to the designated value, a network node may forward control information contained in the user message to the PCRF 405.

To identify and forward control information contained in a user message sent by the UE 401, the same ToS value as that of the UE 401 may be configured at nodes of the operator network handling packets (e.g., the PGW/TDF 404).

In step 410, the UE 401 generates a user message containing control information (e.g., an access token) in order to send the control information to a core network node. This user message is transmitted by using the IP protocol as a network layer protocol. The ToS field of the IP header may be set to the pre-configured information. The user message may be transmitted by using the UDP or TCP protocol as a transport layer protocol. The HTTP or SIP protocol may be used as an application layer protocol. When the UDP transport layer protocol is used, to reduce the packet size and avoid unnecessary packet processing, the UE 401 may send the user message as a UDP datagram without using a separate application layer protocol. To send control information without using an application layer protocol, the control information may be inserted in a payload part of a UDP packet.

In step 415, the UE 401 sends the generated user message to the eNB 402.

In step 420, the eNB 402 forwards the received user message to the SGW 403.

In step 425, the SGW 403 forwards the received user message to the PGW/TDF 404. Upon reception of the user message, the PGW or TDF determines whether the ToS value of the received user message is identical to the ToS value pre-configured for forwarding control information to another core network node (i.e., PCRF 405), in step 430. If the received ToS value is identical to the pre-configured ToS value, the PGW/TDF 404 forwards the user message to the PCRF 405 acting as the receiver node, in step 435. The PGW/TDF 404 may extract control information (e.g., the access token) from the user message and send only the control information to the receiver node.

In step 440, the PCRF 405 may perform additional charging or traffic control based on the control information received from the PGW/TDF 404.

In the above-described embodiment, the ToS field (or DSCP or ECN subfields) of the IP header is used to deliver control information from the UE 401 to the PCRF 405. However, another field of the IP header (e.g., a protocol number field) may be used. Specifically, one of protocol number values (143-252) may be pre-configured at the UE 401 and the PGW/TDF 404. When the IP header of a user message sent by the UE 401 has a pre-configured value in the protocol number field, the PGW/TDF 404 may forward control information contained in the user message to the PCRF 405. Hence, the control information of the UE 401 may be delivered to the PCRF 405 by sending and receiving an IP packet having the pre-configured value in the protocol number field.

Figure 5:
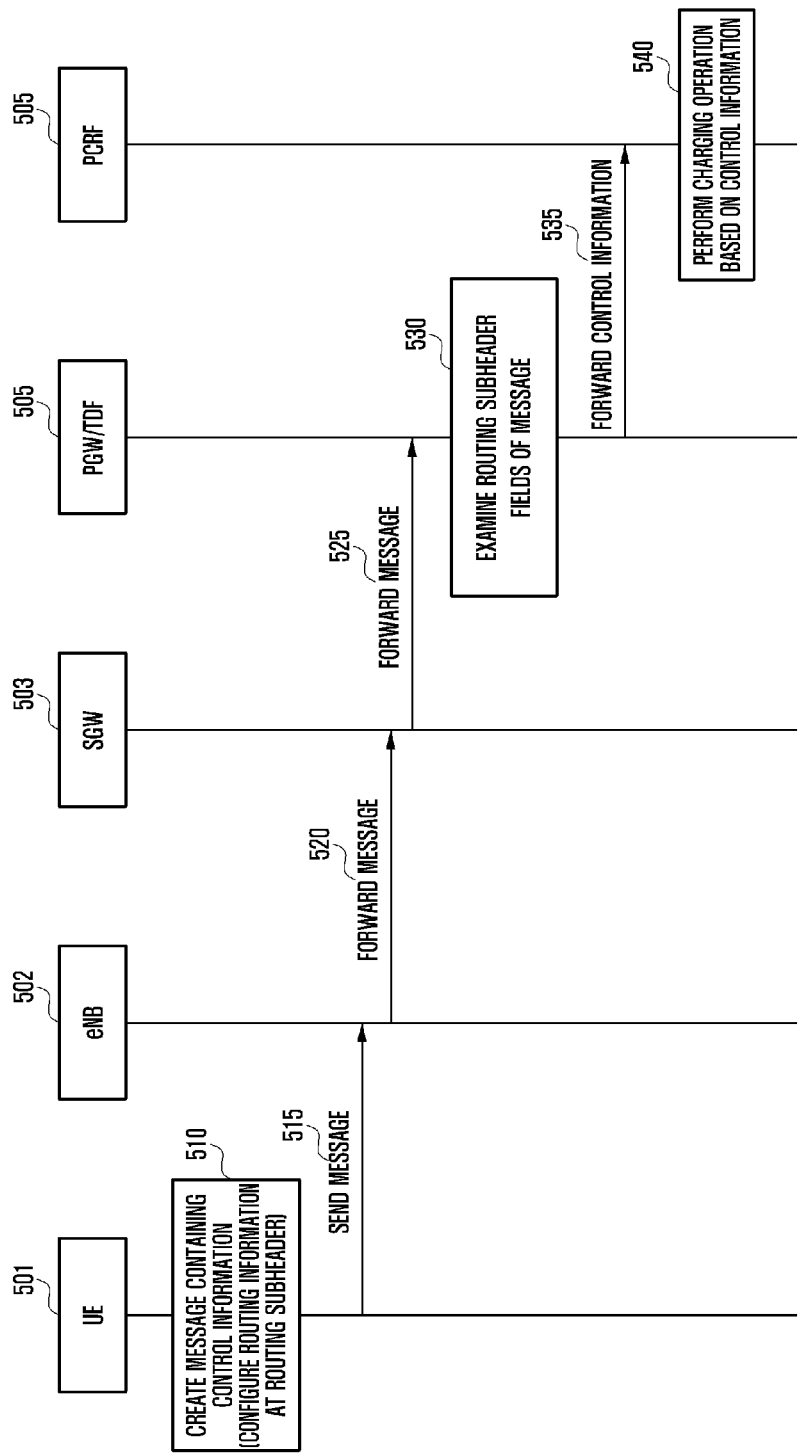
FIG. 5 is a sequence diagram illustrating a procedure to send control information from a user equipment to a core network node, according to an embodiment of the present invention.

FIG. 5 is a sequence diagram illustrating a procedure for sending control information from a user equipment to a core network node, according to an embodiment of the present invention.

Referring to FIG. 5, entities including a UE 501, an eNB 502, an SGW 503, a PGW/TDF 504, and a PCRF 505 send and receive signals to and from another entity.

According to an embodiment of the present invention, control information may be routed between the UE 501 and the node receiving control information (i.e., PCRF 505) using a routing subheader of IPv6 subheaders.

Specifically, in order to send control information (e.g., an access token) to a core network node (e.g., the PCRF 505) using a user message, the UE 501 may receive an IPv6 address allocation. Specifically, in order to use an IPv6 address for a PDN connection through the core network, the UE 501 may set a PDN type field of an Attach request message or a PDN connectivity request message to "IPv6" or "IPv4v6".

In order to send control information contained in a user message sent by the UE 501 to a suitable receiver node (e.g., the PCRF 505), designated information may be stored in a Routing subheader of an IPv6 packet. This information may be pre-configured in the UE 501 or may be delivered through communication with a network entity (e.g., a configuration server). The IPv6 routing subheader may include a routing type and type-specific data fields. Therefore, in order to send control information using the user message, the UE 501 may set the routing type field and the type-specific data field of the IPv6 routing subheader to pre-configured information. For example, the routing type field may be set to 0, and control information to be sent (e.g., an access token) may be stored in the type-specific data field.

In order to identify and forward the control information contained in the user message sent by the UE 501, the same IPv6 routing subheader values (routing type and type-specific data) may be configured at nodes of the operator network handling packets (e.g., the PGW/TDF 504). If the pre-configured values are stored in the IPv6 routing subheader of the user message received from the UE 501, the PGW/TDF 504 may forward control information contained in the user message to the designated node (e.g., the PCRF 505).

In step 510, in order to send control information to a core network node, the UE 501 generates a user message containing the control information (e.g., the access token). This user message is transmitted using the IPv6 protocol as the network layer protocol, and the routing subheader of the IP header may be set to the pre-configured information. The user message may be transmitted by using the UDP or TCP protocol as the transport layer protocol. The HTTP or SIP protocol may be used as the application layer protocol. When the UDP transport layer protocol is used, the UE 501 may send the user message as a UDP datagram without using a separate application layer protocol to reduce the packet size and avoid unnecessary packet processing. To send control information without using an application layer protocol, the control information may be inserted in the payload part of a UDP packet.

In step 515, the UE 501 sends the generated user message to the eNB 502.

In step 520, the eNB 502 forwards the received user message to the SGW 503.

In step 525, the SGW 503 forwards the received user message to the PGW/TDF 504. Upon reception of the user message, the PGW/TDF 505 determines whether the IPv6 routing subheader of the received user message has field values identical to the routing subheader field values pre-configured at the PGW/TDF 505 for forwarding the control information to another core network node (i.e., the PCRF 405), in step 530. If the received IPv6 routing subheader field values are identical to the pre-configured routing subheader field values, the PGW/TDF 504 forwards the user message to the PCRF 505, in step 535. The PGW/TDF 504 may extract control information (e.g., the access token) from the user message and send only the control information to the PCRF 505. In order to prevent the indiscriminate transmission of control information or network attacks from malignant users or UEs, the PGW/TDF 505 may drop or ignore (without forwarding) a user message whose IPv6 routing subheader has 0 at the routing type field and has information other than the pre-configured information in the type-specific data field.

In step 540, the PCRF 505 performs additional charging or traffic control based on the control information received from the PGW/TDF 504.

Additionally, in the embodiments illustrated in FIGS. 3, 4, and 5, the PCRF may send additional control information to the UE. The additional control information may include control information related to UE operation and information corresponding to the control information received by the PCRF from the UE. The PCRF may create a message containing control information using a scheme corresponding to that used by the UE to send control information, and may send the message to the UE via the PGW/TDF. More specifically, to send additional control information to the UE, the PCRF may create a message containing the control information. The PCRF may set an IP address and port number for routing in the message, set routing information in the IP header of the message, or set routing information in the routing subheader of the message. The PCRF may send the message to the PGW/TDF. Thereafter, the message may be sent to the UE via the SGW and the eNB. Upon reception of the message, the UE may determine whether the message contains control information from the PCRF by checking the IP address and port number of the message, checking information contained in the IP header thereof, or checking information contained in the routing subheader thereof. If the message contains control information from the PCRF, the UE may perform an operation indicated by the control information. Specifically, the UE may provide a user interface based on the control information. According to an embodiment of the present invention, the PCRF may directly create a message containing control information to be sent. In another embodiment of the present invention, the PCRF may provide a specific rule to the PGW/TDF, so that the PGW/TDF may create a message according to the rule and send the message to the UE. The operation that is performed at the UE in response to reception of control information from the PCRF is described in greater detail below.

The embodiments of the present invention, described with respect to FIGS. 3, 4, and 5, relate to schemes that enable the UE to send control information for traffic or charging control to a specified core network node using a user message. However, utilization of a user message to send control information may become a target of a denial-of-service (DoS) attack.

Figure 6:
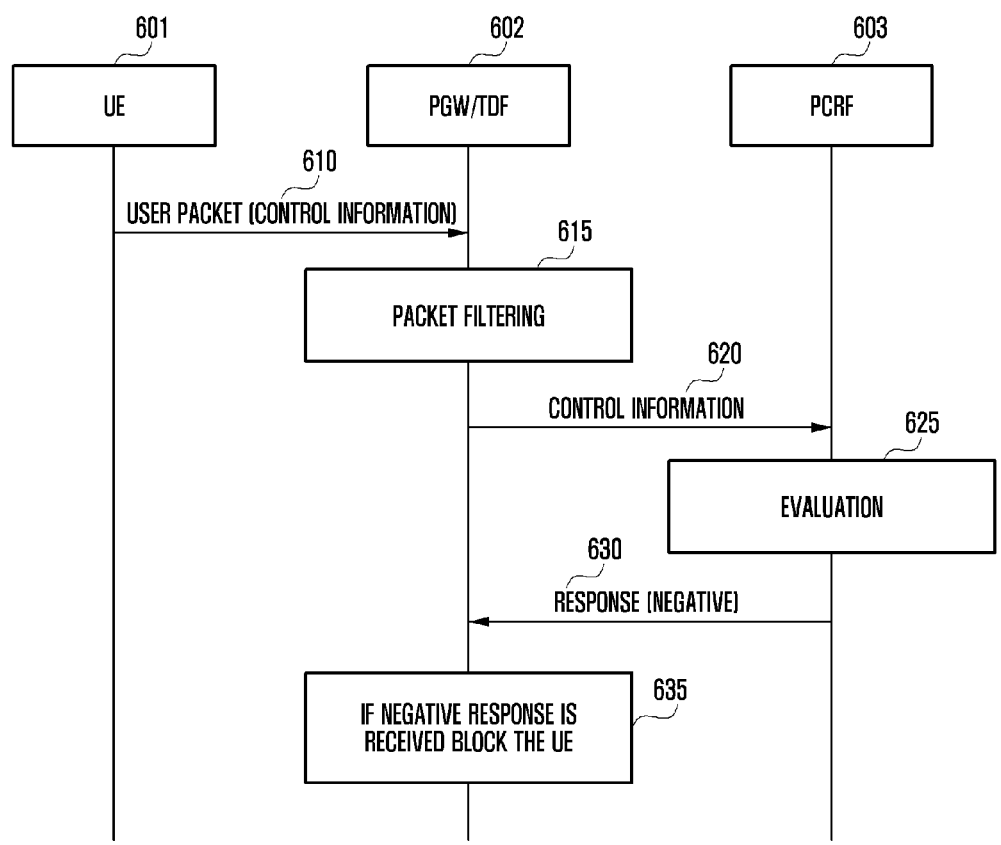
FIG. 6 is a sequence diagram illustrating a procedure to filter control information messages, according to an embodiment of the present invention.

FIG. 6 is a sequence diagram illustrating a procedure for filtering control information messages, according to an embodiment of the present invention.

In FIG. 6, entities including a UE 601, a PGW/TDF 602, and a PCRF 603 send and receive signals to and from another entity.

FIG. 6 and its corresponding description provide a scheme for preventing improper use of a user message containing control information.

In step 610, the UE 601 creates a message containing control information and sends the message to the PGW/TDF 602.

Upon reception of the message, the PGW/TDF 602 performs packet filtering to determine whether the control information is provided in the received message, in step 615.

If the control information is provided in the received message, the PGW/TDF 602 forwards the control information to the PCRF 603, in step 620.

Steps 610 to 620 may be performed according to at least one of the embodiments of the present invention described with respect to FIGS. 3, 4, and 5.

Upon reception of the control information, the PCRF 603 evaluates the received control information by performing an integrity check on the received control information, in step 625. Specifically, the PCRF 603 may use security information in the control information (e.g., a Message Authentication Code (MAC)), and may also use stored security information (e.g., keys or an authentication certificate).

If the received control information is not valid, the PCRF 603 sends a message indicating that the control information is invalid or indicating an integrity check failure, to the PGW/TDF 602, in step 630.

Upon reception of the message indicating that the control information is invalid or indicating the integrity check failure, the PGW/TDF 602 blocks the UE 601 so as to prevent the UE 601 from sending control information again, in step 635. Specifically, an identifier of the UE 601 (e.g., an International Mobile Subscriber Identity (IMSI), an IP address, or a General Packet Radio Service (GPRS) Tunneling Protocol (GTP) Tunnel Endpoint Identifier (TEID)) may be added to a blacklist for packet discard. Messages from the UE 601 may be ignored or discarded. In addition, the PGW/TDF 602 may release the PDN connection associated with the UE 601 so as to prevent the UE 601 from sending a message. To block an additional request for PDN connection creation, the PGW/TDF 602 may also send a back-off timer value to the UE 601, which prevents the UE 601 from issuing a session management request message for a corresponding Access Point Name (APN) for a preset duration by use of a congestion control function for the APN associated with the PDN connection used for transmission of a control information message.

Figure 7:
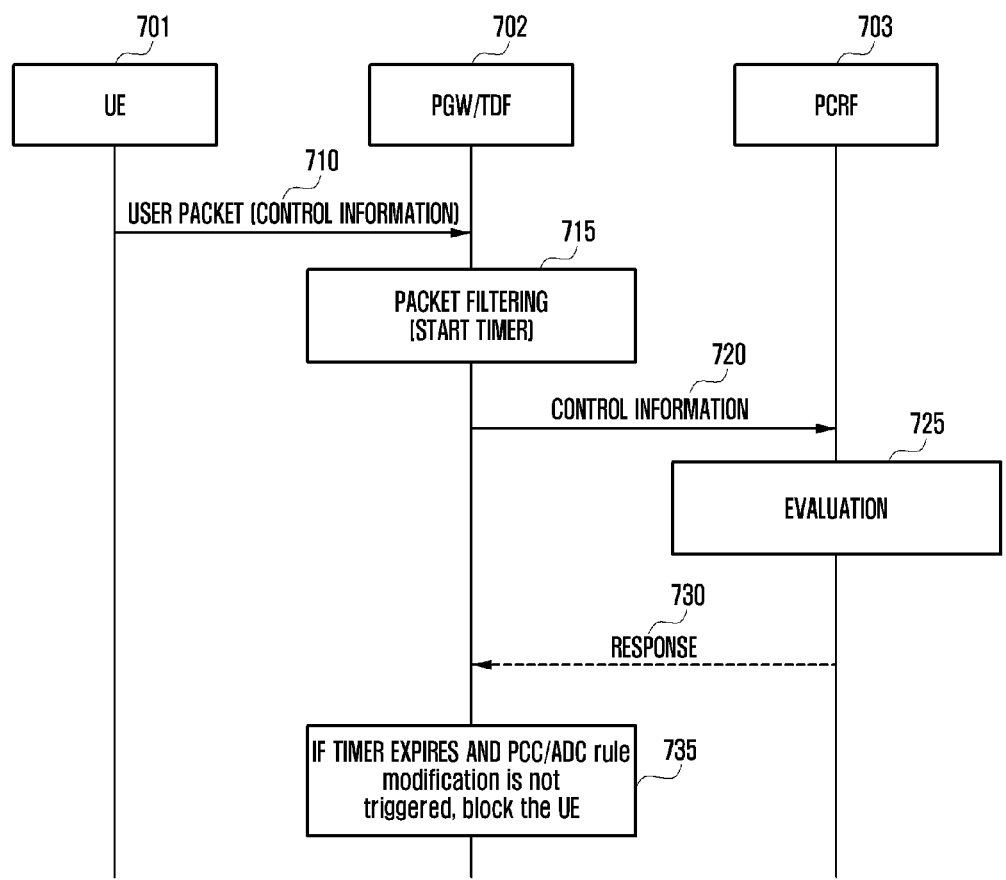
FIG. 7 is a sequence diagram illustrating a procedure to filter control information messages, according to another embodiment of the present invention.

FIG. 7 is a sequence diagram illustrating a procedure for filtering control information messages, according to another embodiment of the present invention.

In FIG. 7, entities including a UE 701, a PGW/TDF 702, and a PCRF 703 send and receive signals to and from another entity.

In step 710, the UE 701 creates a message containing control information and sends the message to the PGW/TDF 702.

Upon reception of the message, the PGW/TDF 702 performs packet filtering to determine whether the control information is provided in the received message, in step 715. The PGW/TDF 702 also starts a timer.

If the control information is provided in the received message, the PGW/TDF 702 forwards the control information to the PCRF 703, in step 720.

Steps 710 to 720 may be performed according to at least one of the embodiments described above with respect to FIGS. 3, 4, and 5.

Upon reception of the control information, the PCRF 703 evaluates the received control information by performing an integrity check on the received control information. Specifically, the PCRF 703 may use security information contained in the control information (e.g., an MAC), and may also use stored security information (e.g., keys or an authentication certificate).

In step 730, if the received control information is valid, the PCRF 703 creates or updates a Policy and Charging Control (PCC)/Application Detection and Control (ADC) rule based on the control information and sends a corresponding response message to the PGW/TDF 702. If the received control information is not valid, the PCRF 703 sends a response message indicating that the control information is invalid or indicating an integrity check failure to the PGW/TDF 702.

If the timer of the PGW/TDF 702 expires before a response message indicating a creation or an update of a PCC rule or ADC rule is received from the PCRF 703, the PGW/TDF 702 blocks the UE 601 so as to prevent the UE 601 from sending control information again, in step 735. Specifically, the identifier of the UE 701 (e.g., an IMSI, an IP address, or a GTP TEID) may be added to a blacklist for packet discard. Messages from the UE 701 may be ignored or discarded. In addition, the PGW may release the PDN connection associated with the UE 701 so as to prevent the UE 701 from sending a message. To block an additional request for PDN connection creation, the PGW may also send a back-off timer value to the UE 701 to prevent the UE 701 from issuing a session management request message for a corresponding APN for a preset duration by use of a congestion control function for the APN associated with the PDN connection used for transmission of a control information message.

Figure 8:
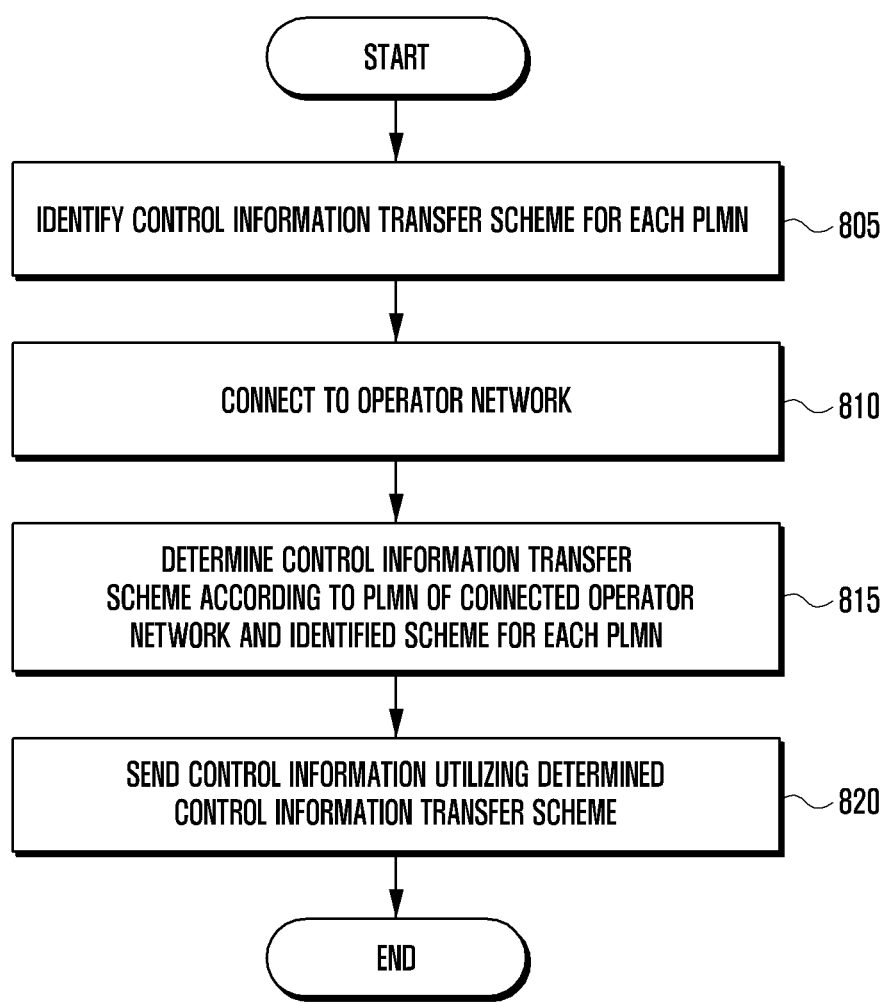
FIG. 8 is a flowchart illustrating a procedure for determining a scheme to deliver control information in a user equipment, according to an embodiment of the present invention.

FIG. 8 is a flowchart illustrating a procedure for determining a scheme to deliver control information in a user equipment, according to an embodiment of the present invention.

Referring to FIG. 8, the UE determines whether to send control information that is received from a server to the operator network.

In step 805, the UE determines a scheme to send control information for each PLMN. According to an embodiment of the present invention, control information may be transferred to the operator network using different schemes for different PLMNs, and the UE may obtain information on the different schemes. The information on the schemes may be pre-configured in the UE, may be obtained when control information is received from a server, or may be obtained when attempting to connect to an operator network associated with a specific PLMN.

In step 810, the UE connects to the operator network and obtains information on the PLMN associated with the operator network.

In step 815, the UE determines the scheme to transfer control information based on the information on the PLMN associated with the operator network obtained in step 810 and the schemes determined in step 805. Specifically, when the UE is successfully attached to the operator network, the UE may identify the operating mode of the operator network using registered PLMNs and may determine the scheme to transfer control information.

In step 820, the UE generates a message containing control information and sends the message to the operator network (destined for the PCRF), according to the determined scheme.

Figure 9:
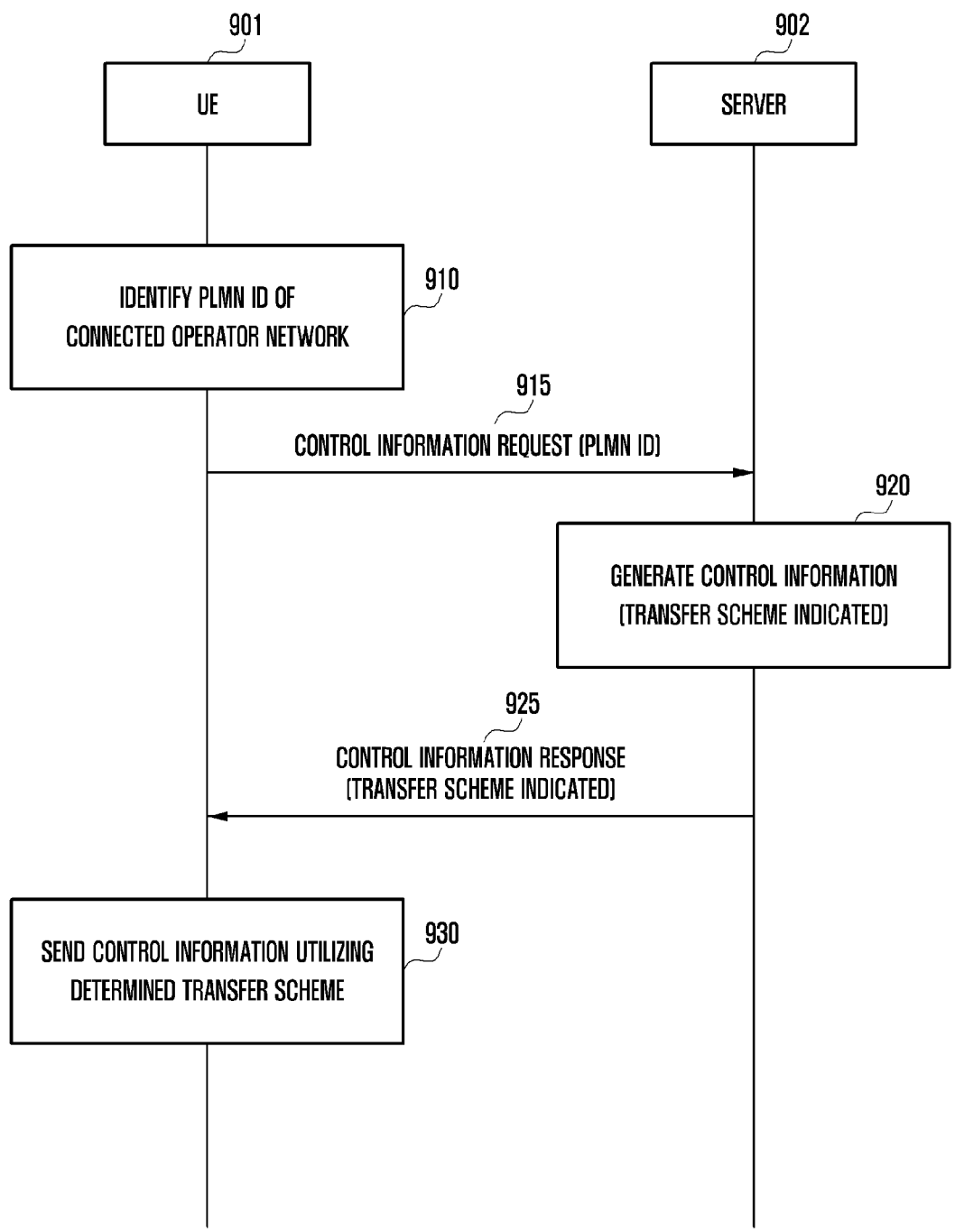
FIG. 9 is a sequence diagram illustrating a procedure to exchange control related information between a user equipment and a server, according to an embodiment of the present invention.

FIG. 9 is a sequence diagram illustrating a procedure for exchanging control related information between a user equipment and a server, according to an embodiment of the present invention.

Referring to FIG. 9, a UE 901 may send and receive signals to and from a server 902. The server 902 may provide information on sponsored services.

In step 910, the UE 901 obtains information on the operator network to which the UE 901 is connected. Specifically, the UE 901 identifies the PLMN ID of the operator network.

In step 915, the UE 901 sends a control information request message containing the PLMN ID to the server 902.

Upon reception of the control information request message, the server 902 generates control information to be sent to the UE 901, in step 920. The control information includes information on the transfer scheme corresponding to the PLMN ID.

In step 925, the server 902 sends the generated control information to the UE 901. The server 902 selects the transfer scheme for the control information based on the registered PLMN ID for the UE 901 and pre-configured information. The selected transfer scheme may be provided to the UE 901 as a portion or supplement of the control information.

In step 930, the UE 901 sends control information to the operator network according to the determined transfer scheme.

Figure 10:
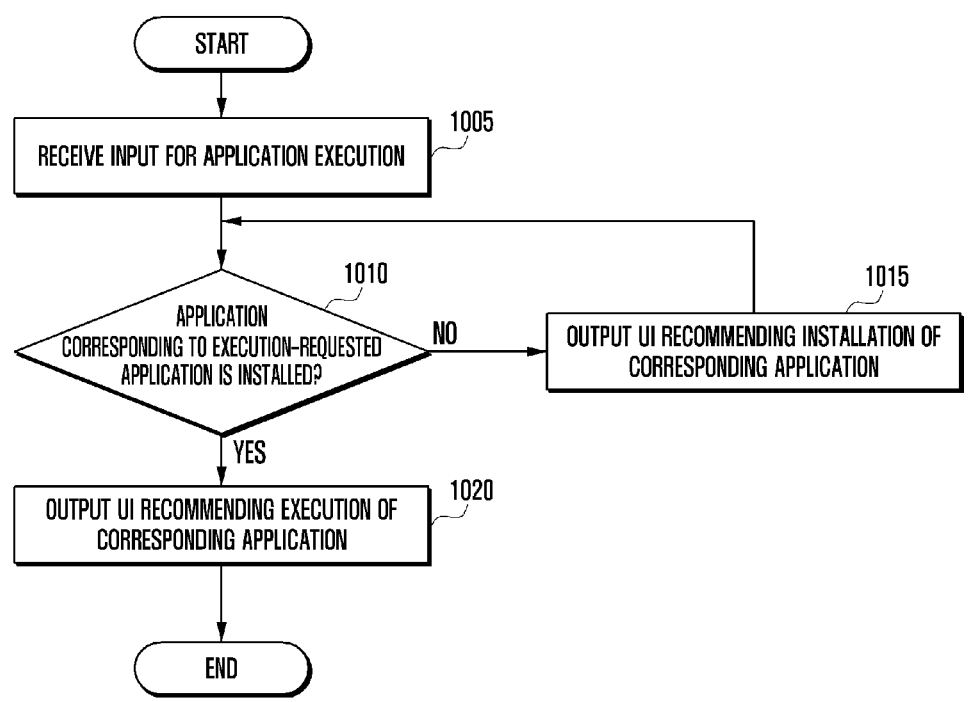
FIG. 10 is a flowchart illustrating a procedure to execute an application in a user equipment, according to an embodiment of the present invention.

FIG. 10 is a flowchart illustrating a procedure for executing an application in a user equipment, according to an embodiment of the present invention.

Referring to FIG. 10, one or more applications may be installed in the user equipment, and an application corresponding to user input may be executed. Among the installed applications, a first application may be related to a sponsored service. The first application may have a corresponding second application. The first application may have ID information of the second application, and may determine whether the second application is installed based on the ID information.

For a given sponsored service, the first application may send and receive information associated with a regular service of the operator network, and the second application may send and receive information associated with the sponsored service.

Referring to FIG. 10, in step 1005, the user equipment detects user input for executing the first application.

In step 1010, the user equipment determines whether the second application, which corresponds to the first application, is installed therein. The user equipment may determine whether the second application is installed based on the ID information of the second application, as described above.

If the second application is not installed, the user equipment provides a User Interface (UI) recommending installation of the second application, in step 1015, and the methodology returns to step 1010.

If the second application is installed, the user equipment provides a UI recommending execution of the second application, in step 1020. Specifically, the user equipment may recommend that the user send and receive data via a sponsored service.

According to the above-described embodiment of the present invention, the first application and the second application may play the opposite roles, and some applications may be associated with each other in terms of a non-sponsored service.

Figure 11:
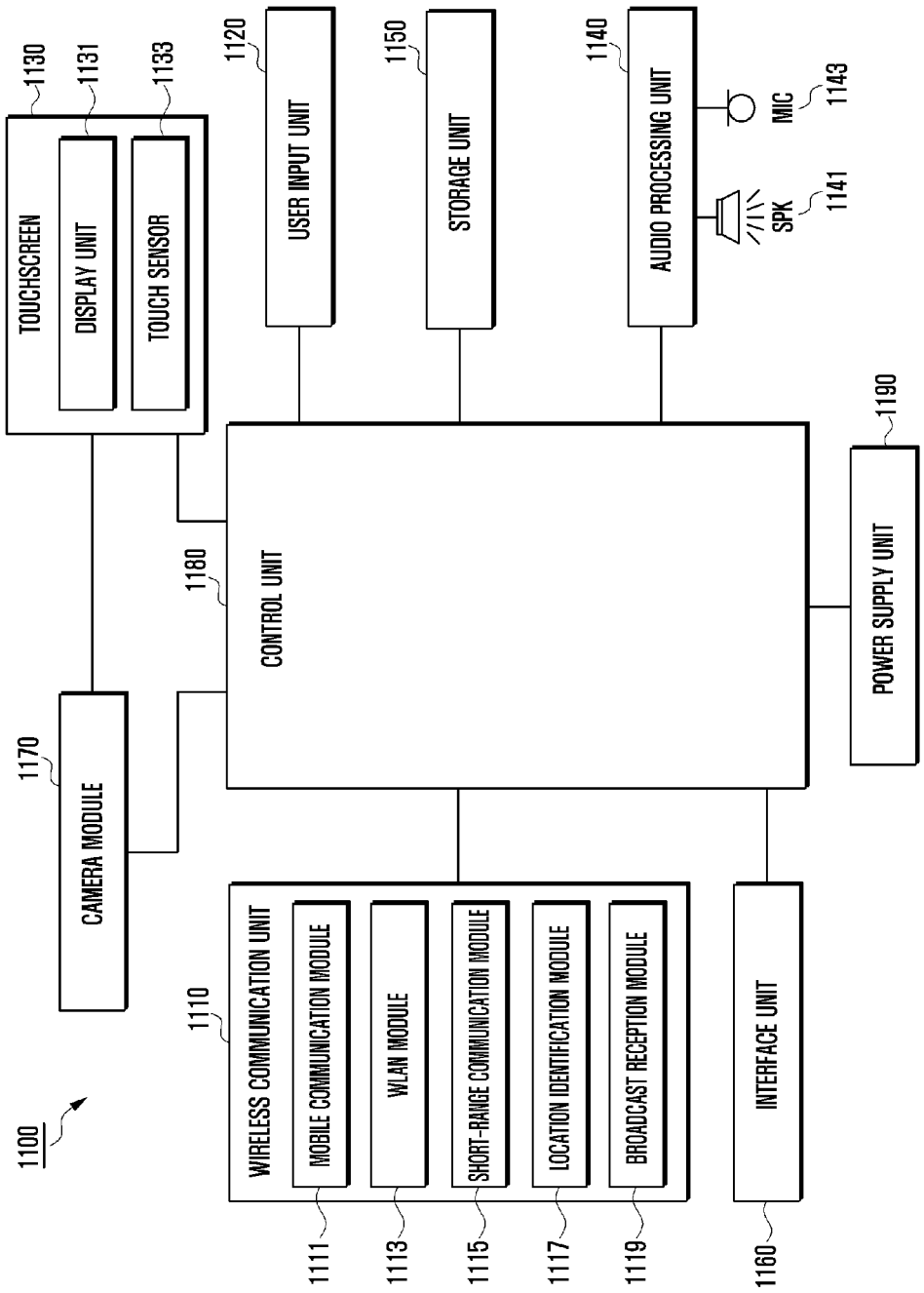
FIG. 11 is a block diagram illustrating a user equipment, according to an embodiment of the present invention.

FIG. 11 is a block diagram illustrating a user equipment, according to an embodiment of the present invention.

Referring to FIG. 11, a UE 1100 includes a wireless communication unit 1110, a user input unit 1120, a touchscreen 1130, an audio processing unit 1140, a storage unit 1150, an interface unit 1160, a camera module 1170, a control unit 1180, and a power supply unit 1190. The components illustrated in FIG. 11 are not indispensable, the UE 1100 may further include one or more units that are not illustrated in FIG. 11, and one or more units of the UE 1100 that are illustrated in FIG. 11 may be removed or replaced.

The wireless communication unit 1110 includes one or more modules that support wireless communication between the UE 1100 and a wireless communication system, or between the UE 1100 and another UE. For example, as shown in FIG. 11, the wireless communication unit 1110 includes at least one of a mobile communication module 1111, a Wireless Local Area Network (WLAN) module 1113, a short-range communication module 1115, a location identification module 1117, and a broadcast reception module 1119.

The mobile communication module 1111 may send and receive radio signals to and from at least one of base stations, external terminals, and servers (such as, for example, an integration server, a provider server, a content server, an Internet server, or a cloud server) on a mobile communication network. The radio signals may carry various types of data in relation to voice calls, video calls, text messages, and multimedia messages.

The mobile communication module 1111 may receive various types of data such as, for example, logs, content, messages, mail, images, videos, weather information, and time information. According to an embodiment of the present invention, the mobile communication module 1111 may connect to one or more of external UEs or servers connected with the UE 1100 via a network (e.g., a mobile communication network), and may receive or obtain various types of data. In response to a user request, the mobile communication module 1111 may send various types of data that is required for UE operation to external UEs or servers.

The WLAN module 1113 may be used to wirelessly access the Internet and to establish a WLAN link to another electronic device. The WLAN module 1113 may be a built-in module or a removable module. Wireless Internet access may be achieved through Wi-Fi, Wireless Broadband (WiBro), Worldwide Interoperability for Microwave Access (WiMAX), High Speed Downlink Packet Access (HSDPA), and mmWave (millimeter Wave).

The WLAN module 1113 may send data to an external device or receive data from an external device according to a user selection. The WLAN module 1113 may receive or obtain data from one or more of external UEs and servers connected with the UE 1100 via a network (e.g., a wireless Internet). In response to a user request, the WLAN module 1113 may send and receive various types of data to and from external UEs or servers. When a WLAN link to a different electronic device is established, the WLAN module 1113 may send and receive various pieces of data to and from the different electronic device according to a user selection. The WLAN module 1113 may always be on or may be turned on according to user settings or user input.

The short-range communication module 1115 is used to support short-range communication. Short-range communication may be provided through, for example, Bluetooth, Bluetooth Low Energy (BLE), Radio Frequency Identification (RFID), Infrared Data Association (IrDA), Ultra Wideband (UWB), ZigBee, and Near Field Communication (NFC).

The short-range communication module 1115 may send and receive various types of data. The short-range communication module 1115 may receive or obtain data from an external electronic device connected with the UE 1100 via a network (e.g., a short-range communication network). When a short-range link to a different electronic device is established, the short-range communication module 1115 may send and receive various pieces of data to and from the different electronic device according to a user selection. The short-range communication module 1115 may always be on or may be turned on according to user settings or user input.

The location identification module 1117 is used to identify the location of the UE 1100. A representative example of the location identification module 1117 is a Global Positioning System (GPS) module. The location identification module 1117 may compute the latitude, longitude, and altitude of the current location by applying triangulation to distance and time information received from three or more base stations. The location identification module 1117 may also identify the current location using signals that are received in real time from three or more satellites. Location information of the UE 1100 may be obtained in various ways.

The broadcast reception module 1119 may receive a broadcast signal (e.g., a TV broadcast signal, a radio broadcast signal, or a data broadcast signal) and associated information (e.g., information regarding broadcast channels, broadcast programs, and broadcast service providers) from an external broadcasting management server through a broadcast channel (e.g., satellite channel or terrestrial channel).

The user input unit 1120 may generate an input signal for controlling the UE 1100 corresponding to user manipulation. The user input unit 1120 may include at least one input means for detecting user input, such as, for example, a keypad, a dome switch, a button, a touchpad (resistive or capacitive), a jog shuttle, and a sensor. A button may be used to detect user input for executing a preset function, and may be realized as a separate element or as a part of a touchpad. A button may be a soft button formed on a portion of the touchscreen 1130 or a hard button formed outside of the touchscreen 1130. The user input unit 1120 may include a button capable of distinguishing a touch input from a press input. A press input may correspond to a physical force applied to the button, and a touch input may correspond to contact with the button. The press input may incorporate the touch input. Specifically, an input applied to the button may be recognized as a touch input when a pressure of the input is less than or equal to a threshold, and the input may be recognized as a press input when the pressure of the input is greater than the threshold.

The sensor of the user input unit may include, for example, a voice recognition sensor, a fingerprint recognition sensor, an infrared sensor, an acceleration sensor, a gyro sensor, a geomagnetic sensor, an illumination sensor, a color sensor, an image sensor, a temperature sensor, a proximity sensor, a motion recognition sensor, a heart rate monitor sensor, an iris recognition sensor, an ElectroEncephaloGram (EEG) sensor, an ElectroCardioGram (ECG) sensor, and a pressure sensor.

The user input unit 1120 may include physical buttons formed on the exterior of the UE 1100 and virtual buttons on a touch panel. The user input unit 1120 may receive user input for manipulating the UE 1100 and generate an input signal corresponding to the user input. For example, the user input unit 1120 may receive user input to display or select an item, to initiate an application, to enter data (via typing or editing), to change a posture, to display content, to access a network, to transmit or receive data, and may generate an input signal corresponding to the user input. One of the installed applications may be executed according to an input signal generated by the user input unit 1120.

The touchscreen 1130 is an input/output means supporting both an input function and a display function, and includes a display unit 1131 and a touch sensor 1133. The display unit 1131 of the touchscreen 1130 is used to display various screens while the UE 1100 operates, including, for example, an item display screen, a lock screen, a fingerprint recognition screen, an instant messenger screen, a call handling screen, a gaming screen, a video playback screen, a gallery screen, a webpage screen, a home screen, and a network access screen. When a gesture event (e.g., a touch, hovering, or an air gesture) is detected by the touch sensor 1133 while a specific screen is displayed on the display unit 1131, the touchscreen 1130 may send an input signal corresponding to the gesture event to the control unit 1180, which may then identify the gesture event and control an operation according to the gesture event.

The display unit 1131 may display or output various information processed by the UE 1100. For example, the display unit 1131 may display a UI or a Graphical UI (GUI) for item display and selection. When the UE 1100 is in a call handling mode, the display unit 1131 may display a UI or GUI for call handling. The concept of the GUI may be included in the concept of the UI. The display unit 1131 may display a control UI for displaying and selecting one or more items. An item placed in a region other than the control UI may be selected in response to an input provided on the control UI. An item placed in a region other than the user input unit 1120 may be selected in response to input on the user input unit 1120 without displaying a control UI. When the UE 1100 is in a video call or capture mode, the display unit 1131 may output a UI or GUI for displaying received or captured images. The display unit 1131 may be used to display various pieces of data and content in the course of operating the UE 1100, and to display information on external UEs on a network. The display unit 1131 may display various screens associated with an executing application. In particular, the display unit 1131 may output a UI that recommends installation or execution of a corresponding application.

The display unit 1131 may display a screen in a landscape mode or portrait mode and may switch between the landscape mode and the portrait mode according to a rotation or a placement of the UE 1100. The display unit 1131 may be realized using one or more of a Liquid Crystal Display (LCD), a Thin Film Transistor-LCD (TFT-LCD), Light Emitting Diodes (LEDs), Organic LEDs (OLED), Active Matrix OLEDs (AMOLEDs), a flexible display, a bendable display, and a 3-Dimensional (3D) display. The display unit 1131 may also use transparent display technology supporting transparency or light transparency.

The touch sensor 1133 may be disposed on the display unit 1131 and may sense user input corresponding to a touch on the surface of the touchscreen 1130 or corresponding to a proximity thereto. User input may be a touch or proximity event corresponding to single touch, a multi-touch, hovering, or an air gesture. For example, user input may correspond to a tap, a drag, a sweep, a flick, a swipe, a drag and drop, or a drawing (e.g., handwriting). When user input (e.g., a touch event or a proximity event) is detected on the surface of the touchscreen 1130, the touch sensor 1133 may generate an input signal corresponding to the user input and send the input signal to the control unit 1180, which may then perform a function according to the region in which the user input is generated.

According to an embodiment of the present invention, the touch sensor 1133 may receive user input for initiating operation of the UE 1100, and may generate an input signal corresponding to the user input.

The touch sensor 1133 may be configured to convert a pressure change or capacitance change, detected in a region of the display unit 1131, into an electrical signal. The touch sensor 1133 may sense the position and area of the user touch or proximity input, and may also sense a pressure caused by the touch input according to an employed touch technique. Upon detection of user input (touch or proximity), the touch sensor 1133 may send a corresponding electrical signal to a touch controller. The touch controller may process the received electrical signal and send data corresponding to the processed result to the control unit 1180. Thereby, the control unit 1180 may identify the touch or proximity point on the touchscreen 1130, and may perform a corresponding function.

The audio processing unit 1140 may send an audio signal from the control unit 1180 to a speaker 1141, and may send an audio signal such as a voice signal from a microphone 1143 to the control unit 1180. Under control of the control unit 1180, the audio processing unit 1140 may convert voice or audio data into an audio signal, and may output the audio signal through the speaker 1141. The audio processing unit 1140 may also convert an audio signal, such as a voice signal from the microphone 1143, into a digital signal and send the digital signal to the control unit 1180. The audio processing unit 1140 may output an audio signal responsive to user input, according to audio processing information (e.g., a sound effect or a music file) embedded in data.

The speaker 1141 may be used to output audio data received through the wireless communication unit 1110 or stored in the storage unit 1150. The speaker 1141 may also be used to output various sound effects related to functions being executed on the UE 1100.

The microphone 1143 may be used to receive an audio signal from an external environment and convert the audio signal into electrical audio data. During a call, processed audio data may be converted into a format transmittable to the external environment through the mobile communication module 1111. The microphone 1143 may implement a variety of noise reduction algorithms to remove noise that occurs while an audio signal is received from the external environment.

The storage unit 1150 may store one or more programs executable by the control unit 1180, and may temporarily store input/output data such as, for example, logs, content, messenger data (e.g., conversation data), contact information (e.g., fixed or mobile telephone numbers), messages, and media files (e.g., audio, video, and image files). In particular, the storage unit 1150 may store control information received from a server and PLMN ID information received from an operator network.

The storage unit 1150 may store various programs and data related to the display of an item on the UE 1100. For example, the storage unit 1150 may store one or more items that are composed internally or received from an external environment, one or more programs for selection of an item in response to a user interaction, and data processed by the one or more programs.

The storage unit 1150 may also store information on usage frequencies, importance, and priorities of applications and content. The storage unit 1150 may store information on various patterns of vibrations and sound effects that are output in response to a touch or proximity input on the touchscreen 1130. The storage unit 1150 may temporarily or semi-permanently store an Operating System (OS) of the UE 1100, programs supporting input and display operations of the touchscreen 1130, programs supporting or controlling various functions of the UE 1100, and data generated during program execution.

The storage unit 1150 may include one or more types of storage media, such as, for example, a flash memory, a hard disk, a multimedia or other memory card (e.g., a Secure Digital (SD) card, a micro SD card, or eXtreme Digital (XD) card), a Dynamic Random Access Memory (DRAM), a Static Random Access Memory (SRAM), a Read Only Memory (ROM), a Programmable ROM (PROM), an Electrically Erasable PROM (EEPROM), a Magnetic RAM (MRAM), a magnetic disk, and an optical disc. The storage unit 1150 may function in cooperation with Web storage on the Internet.

The interface unit 1160 may be used as an interface for connecting an external device to the UE 1100. The interface unit 1160 may be used to receive data or power from an external device and to send internal data to the external device. For example, the interface unit 1160 may include a wired/wireless headset port, a charger port, a wired/wireless data port, a memory card port, a port for a device embedding an identification module, an audio input/output port, a video input/output port, and an earphone port.

The camera module 1170 is configured to support a photographing function of the UE 1100. The camera module 1170 may capture an image (e.g., a still image or a moving image) of a target object. Under the control of the control unit 1180, the camera module 1170 may capture an image of a target object and send the captured image data to the display unit 1131 and the control unit 1180. The camera module 1170 may include an image sensor (or a camera sensor) to convert an input light signal into an electrical signal, and an image signal processor to convert the electrical signal from the image sensor to digital image data. The image sensor may be a Charge Coupled Device (CCD) sensor or a Complementary Metal Oxide Semiconductor (CMOS) sensor. The camera module 1170 may support image processing functions to realize various photographing options related to zooming, aspect ratios, and effects (e.g., sketch, mono, sepia, vintage, mosaic, and frame effects) according to user settings.

The control unit 1180 may control the overall operation of the UE 1100. For example, the control unit 1180 may control operations related to voice communication, data communication, and video communication. In particular, the control unit 1180 may control operations related to item display and selection according to user input.

For example, the control unit 1180 may obtain control information from a server and send the control information to a core network node of an operator network through a user plane message. Control information may be sent using at least one of the schemes described in detail above.

The control unit 1180 may be composed of one or more processors that can execute one or more programs stored in the storage unit 1150 to control operations of the UE 1100. For example, in the UE 1100, the control unit 1180 may control the display unit 1131 to display a control UI containing one or more items, and may control one of the touch sensor 1133 and the user input unit 1120 to detect a user input for item selection.

In addition, the control unit 1180 may control regular operations of the UE 1100. For example, when an application is executed, the control unit 1180 may control application execution and screen display for the application. The control unit 1180 may receive an input signal corresponding to a touch or proximity event generated on a touch-based input interface (such as, for example, the touchscreen 1130), and may control function execution according to the input signal. The control unit 1180 may also control transmission and reception of various pieces of data carried out through wired or wireless communication.

The power supply unit 1190 may supply power from an external or internal power source to the individual components of the UE 1100 under control of the control unit 1180. In particular, under the control of the control unit 1180, the power supply unit 1190 may supply or shut off power to the display unit 1131.

Various embodiments of the present invention can be implemented using hardware, software, or a combination thereof. A software implementation can be stored in a storage medium readable by a computer or a similar device. A hardware implementation may be achieved using at least one of an ASIC, a Digital Signal Processor (DSP), a Digital Signal Processing Device (DSPD), a Programmable Logic Device (PLD), an FPGA, a processor, a controller, a microcontroller, a microprocessor, and an electric unit realizing a specific function.

For example, the storage medium may be a computer readable storage medium storing a program that is configured to select content to be used as a lock screen when turning on or off of the display unit 1131, to change the lock screen according to the selection result, to detect user interaction through at least one button (e.g., a power button, a volume button, a home button), and to display the changed lock screen in response to turning on of the display unit 1131.

Embodiments of the present invention may be directly implemented by the control unit 1180. Procedures and functions described with respect to embodiments of the present invention may be implemented by software modules. Each software module may perform one or more functions or operations described herein.

Figure 12:
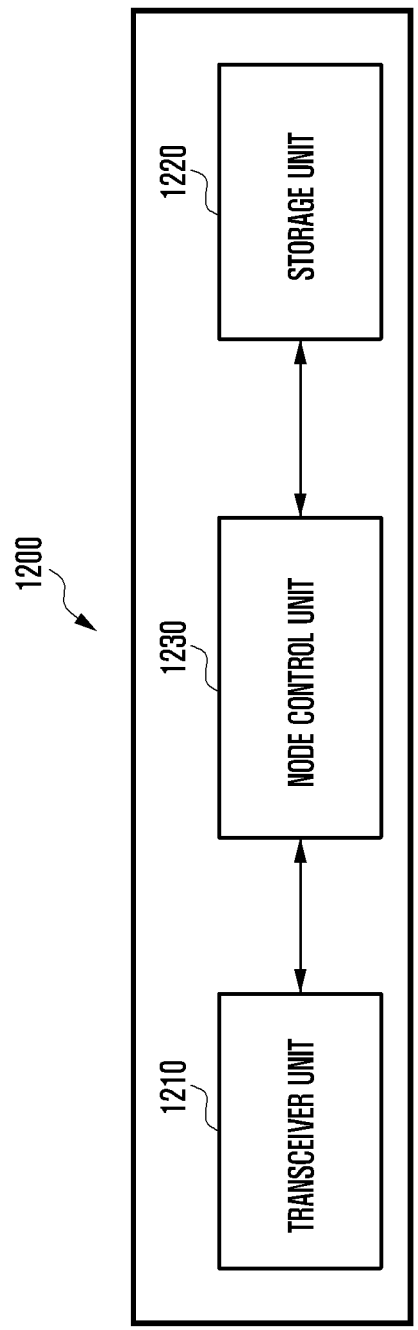
FIG. 12 is a block diagram illustrating a core network node, according to an embodiment of the present invention.

FIG. 12 is a block diagram illustrating a core network node, according to an embodiment of the present invention.

In FIG. 12, a core network node 1200 may be the PGW or the TDF, and includes a transceiver unit 1210, a storage unit 1220, and a control unit 1230.

The transceiver unit 1210 may send and receive signals to and from another network node.

The storage unit 1220 may store information required for operation of the core network node 1200 and information sent and received through the transceiver unit 1210. In particular, the storage unit 1220 may store information required to determine whether to forward a user plane message, which is received from a UE, to the PCRF.

The control unit 1230 may control the overall operation of the core network node 1200, according to embodiments of the present invention. When a user plane message is received from a UE, the control unit 1230 may determine whether to forward the received message to a designated node based on information provided in the received message, and may block network access of the UE that sent the message.

Figure 13:
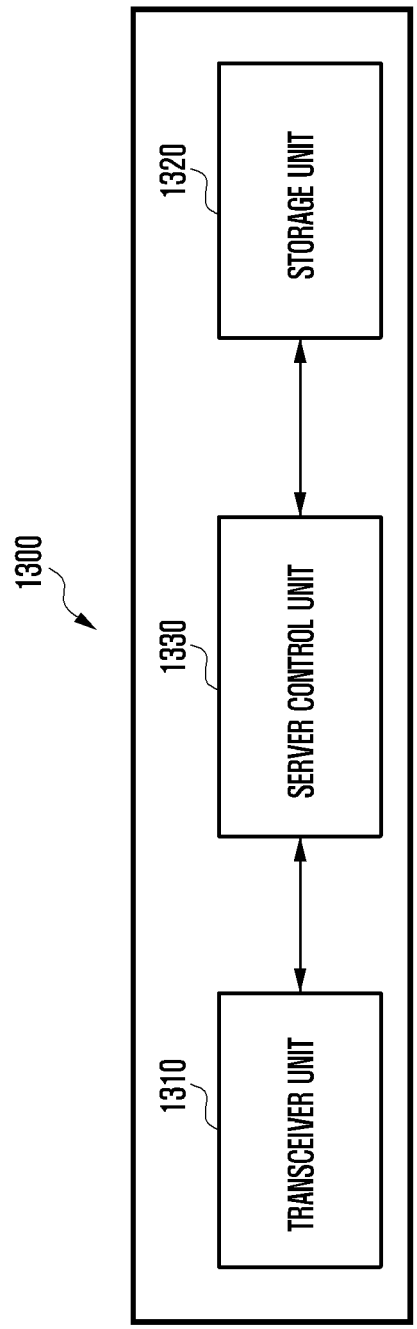
FIG. 13 is a block diagram illustrating a charging related server, according to an embodiment of the present invention.

FIG. 13 is a block diagram illustrating a charging related server, according to an embodiment of the present invention.

In FIG. 13, a charging related server 1300 may be the PCRF, and includes a transceiver unit 1310, a storage unit 1320, and a control unit 1330.

The transceiver unit 1310 may send and receive signals to and from another network node.

The storage unit 1320 may store information required for operation of the charging related server 1300, and information sent and received through the transceiver unit 1310.

The control unit 1330 may control the overall operation of the charging related server 1300, according to embodiments of the present invention. The control unit 1330 may apply a charging policy based on control information sent by a UE via the PGW or TDF, and may determine the validity of the control information and notify the PGW or TDF of the validity.

Figure 14:
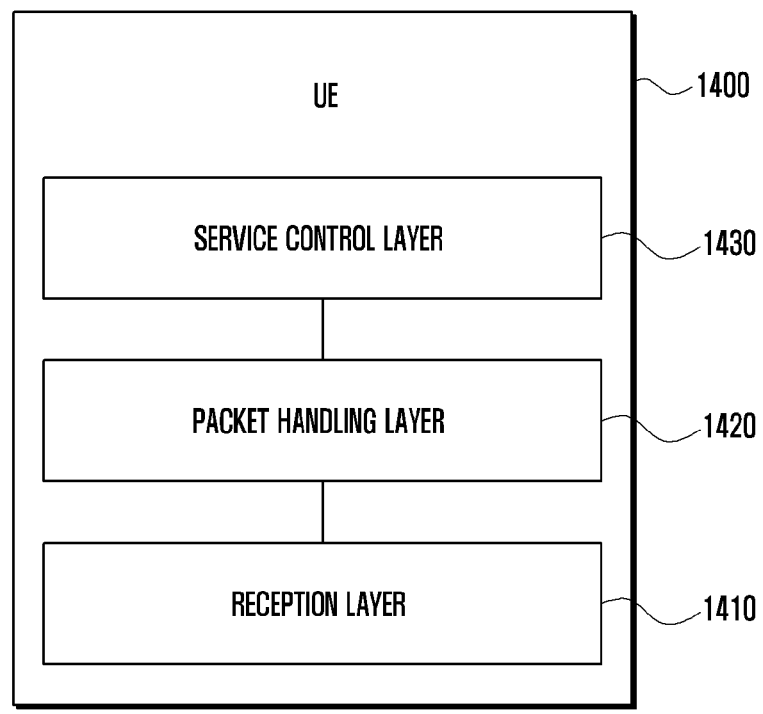
FIG. 14 is a diagram illustrating a structure of a user equipment, according to an embodiment of the present invention.

FIG. 14 is a diagram illustrating a structure of a user equipment, according to an embodiment of the present invention.

Referring to FIG. 14, a UE 1400 has a plurality of layers to process received messages. Specifically, the UE 1400 has a reception layer 1410 for receiving a message, a packet handling layer 1420 for processing a received packet, and a service control layer 1430 for performing service control according to received information.

Each layer may be realized as a physical or logical module, and may operate as a software or daemon process. Each layer may have a different name that corresponds to the main function thereof.

The reception layer 1410 may receive a message destined for the UE 1400. For example, the reception layer 1410 may receive a message from the eNB.

The packet handling layer 1420 may process a packet contained in a received message. The packet handling layer 1420 may perform an operation corresponding to that of the PGW/TDF on the network. The packet handling layer 1420 may perform packet processing based on at least one of the IP address and port number, information contained in the IP header, and information contained in the routing subheader of the received message. If at least one of the IP address and port number, the information contained in the IP header, and the information contained in the routing subheader matches pre-configured information, the packet handling layer 1420 may determine that control information is provided in the received message from the PCRF and may forward the control information to the service control layer 1430.

The service control layer 1430 may control operation of the UE 1400 based on the information provided in the received message, in a manner corresponding to that of the PCRF. When the control information is forwarded by the packet handling layer 1420, the service control layer 1430 may perform an operation indicated by the control information. The service control layer 1430 may provide a UI according to the control information sent by the PCRF. For example, when the PCRF sends the UE 1400 additional control information indicating approval of a packet transmission related to a sponsored service, in response to control information sent by the UE 1400, the service control layer 1430 may provide a UI indicating availability of the sponsored service on the display unit.

In the above-described embodiments of the present invention, steps may be selectively executed or skipped. Steps may be executed in an order that is different from the listed order. For example, two steps listed in sequence may be executed at the same time or in reverse order. The above description of various embodiments of the present invention is to be construed as exemplary only, and does not describe every possible instance of the present invention. It should be apparent to those skilled in the art that the description of various embodiments of the present invention is provided for illustrative purposes only, and not for the purpose of limiting the present invention.

In the above-described embodiments of the present invention, the PGW or TDF is used as an intermediate node to transfer control information to a designated core network node. However, using the PGW or TDF as an intermediate node is for ease of description only, and the present invention is not limited thereto. Any other gateway node or router on the core network may be used as an intermediate node.

According to an embodiment of the present invention, it is possible to send control information from a user equipment to a core network node without increasing a load of a control plane in a communication system. In particular, control information can be delivered from the user equipment to the core network node using user plane messages without modification to an existing network configuration.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of signal transmission and reception by a terminal in a mobile communication system, the method comprising:

acquiring control information related to a service associated with the terminal; and transmitting, to a server for charging via a base station, a user plane message related to the service generated based on the control information, wherein the user plane message comprises charging information related to the service identified based on the control information.

2. The method of claim 1, wherein acquiring the control information comprises receiving the control information from a service server, wherein the method further comprises generating the user plane message based on the control information, wherein the control information comprises information identifying a control information transfer scheme of an operator network to which the terminal is attached, wherein the user plane message is generated based on the control information transfer scheme, and wherein the user plane message is transmitted if the control information satisfies a preset condition.

3. The method of claim 1, further comprising determining a validity of the control information, wherein the user plane message is transmitted if the control information is determined to be valid.

4. The method of claim 1, wherein the user plane message further comprises at least one of an internet protocol (IP) address and a port number used for routing to the server for charging, and wherein the user plane message further comprises information used for routing to the server for charging in an IP header or a routing subheader.

5. The method of claim 1, wherein the user plane message is generated based on public land mobile network (PLMN) information of the operator network to which the terminal is attached.

6. A method for signal transmission and reception by a traffic control node of a mobile communication system, the method comprising:

receiving, from a terminal, a user plane message related to a service, the user plane message comprising charging information related to the service; and forwarding, to a server for charging, the charging information based on the user plane message, wherein the charging information is identified based on control information related to traffic associated with the terminal.

7. The method of claim 6, wherein the user plane message is generated based on the control information received by the terminal from a service server, wherein the user plane message is generated based on information identifying a control information transfer scheme associated with an operator network received from the service server, and wherein the user plane message is received at the traffic control node if the terminal determines that the control information satisfies a preset condition.

8. The method of claim 6, wherein the user plane message is received at the traffic control node if the terminal determines that the control information is valid.

9. The method of claim 6, wherein the user plane message further comprises at least one of an internet protocol (IP) address and a port number used for routing to the server for charging, wherein the control information is forwarded to the server for charging using the at least one of the IP address and the port number, wherein the user plane message further comprises information used for routing to the server for charging in an IP header or a routing subheader, and wherein the control information is forwarded to the server for charging using the information in the IP header or routing subheader.

10. The method of claim 6, wherein the user plane message is generated based on public land mobile network (PLMN) information of an operator network to which the terminal is attached.

11. A terminal capable of signal transmission and reception in a mobile communication system, the terminal comprising:

a transceiver configured to transmit and receive a signal; and a controller configured to:
control the transceiver,
acquire control information related to traffic a service associated with the terminal, and
transmit, to a server for charging via a base station, a user plane message related to the service generated based on the control information, wherein the user plane message comprises charging information related to the service identified based on the control information.

12. The terminal of claim 11, wherein the controller is further configured to:
receive the control information from a service server for charging, and
generate the user plane message based on the control information, wherein the control information comprises information identifying a control information transfer scheme of an operator network to which the terminal is attached,
wherein the user plane message is generated based on of the control information transfer scheme, and wherein the user plane message is transmitted if the control information received from the service server satisfies a preset condition.

13. The terminal of claim 11, wherein the controller is further configured to determine a validity of the control information, and wherein the user plane message is transmitted if the control information is determined to be valid.

14. The terminal of claim 11, wherein the user plane message further comprises at least one of an Internet Protocol (IP) address and a port number used for routing to the server for charging, and wherein the user plane message further comprises information used for routing to the server for charging in an IP header or a routing subheader.

15. The terminal of claim 11, wherein the user plane message is generated based on public land mobile network (PLMN) information of the operator network to which the terminal is attached.

16. A traffic control node capable of signal transmission and reception in a mobile communication system, the traffic control node comprising:

a transceiver configured to transmit and receive a signal; and a controller configured to:
control the transceiver,
receive, from a terminal, a user plane message related to a service, the user plane message comprising charging information related to the service, and
forward, to the server for charging, the charging information based on the user plane message, wherein the charging information is identified based on control information related to traffic associated with the terminal.

17. The traffic control node of claim 16, wherein the user plane message is generated based on the control information received by the terminal from a service server, wherein the user plane message is generated based on information identifying a control information transfer scheme associated with an operator network received from the service server, and wherein the user plane message is received at the traffic control node if the terminal determines that the control information satisfies a preset condition.

18. The traffic control node of claim 16, wherein the user plane message is received at the traffic control node if the terminal determines that the control information is valid.

19. The traffic control node of claim 16, wherein the user plane message further comprises at least one of an Internet Protocol (IP) address and a port number used for routing to the server for charging, wherein the control information is forwarded to the server for charging using the at least one of the IP address and the port number, wherein the user plane message further comprises information used for routing to the server for charging in an IP header or a routing subheader, and wherein the control information is forwarded to the server for charging using the information in the IP header or routing subheader.

20. The traffic control node of claim 16, wherein the user plane message is generated based on public land mobile network (PLMN) information of an operator network to which the terminal is attached.

* * * * *